United States Patent [19]
Barosi

[11] 4,119,488
[45] Oct. 10, 1978

[54] NUCLEAR REACTOR FUEL ELEMENT EMPLOYING ZR₂NI AS A GETTER METAL

[75] Inventor: Aldo Barosi, Milan, Italy

[73] Assignee: S.A.E.S. Getters S.p.A., Milan, Italy

[21] Appl. No.: 792,854

[22] Filed: May 2, 1977

Related U.S. Application Data

[62] Division of Ser. No. 670,953, Mar. 26, 1976, Pat. No. 4,071,335.

[30] Foreign Application Priority Data

Apr. 10, 1975 [IT] Italy ............................. 22211 A/75

[51] Int. Cl.² ................................................ G21C 3/02
[52] U.S. Cl. .......................................... 176/68; 55/68; 252/181.6
[58] Field of Search .............. 176/68; 55/68, 74, 33; 316/25; 417/48, 51; 252/181.6

[56] References Cited

U.S. PATENT DOCUMENTS

| | | | |
|---|---|---|---|
| 1,958,967 | 5/1934 | Kniepen | 316/25 X |
| 3,104,049 | 9/1963 | Compton et al. | 417/51 X |
| 3,620,645 | 11/1971 | della Porta | 316/25 X |
| 3,899,392 | 8/1975 | Grossman et al. | 176/68 |
| 4,065,352 | 12/1977 | Iwano et al. | 176/68 |

*Primary Examiner*—Peter A. Nelson
*Attorney, Agent, or Firm*—Littlepage, Quaintance, Murphy, Richardson and Webner

[57] ABSTRACT

$Zr_2Ni$ sorbs both oxygen and hydrogen from water making its use advantageous as a getter metal in a nuclear reactor fuel element.

9 Claims, 3 Drawing Figures

U.S. Patent     Oct. 10, 1978     4,119,488
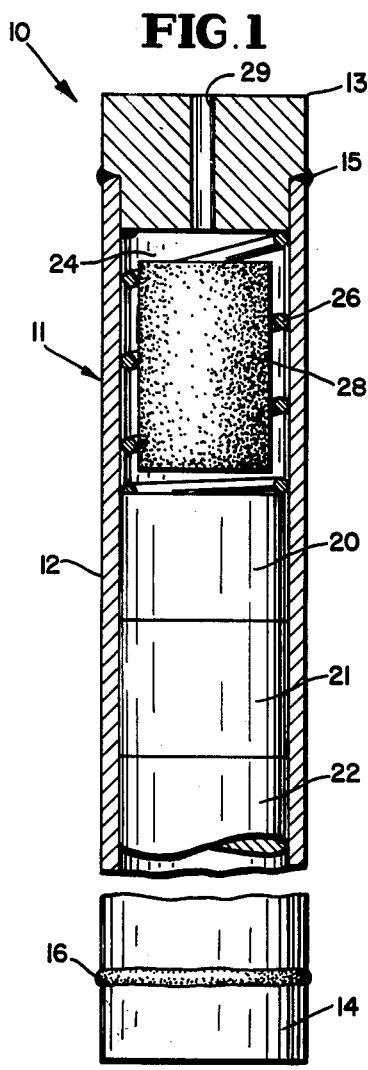
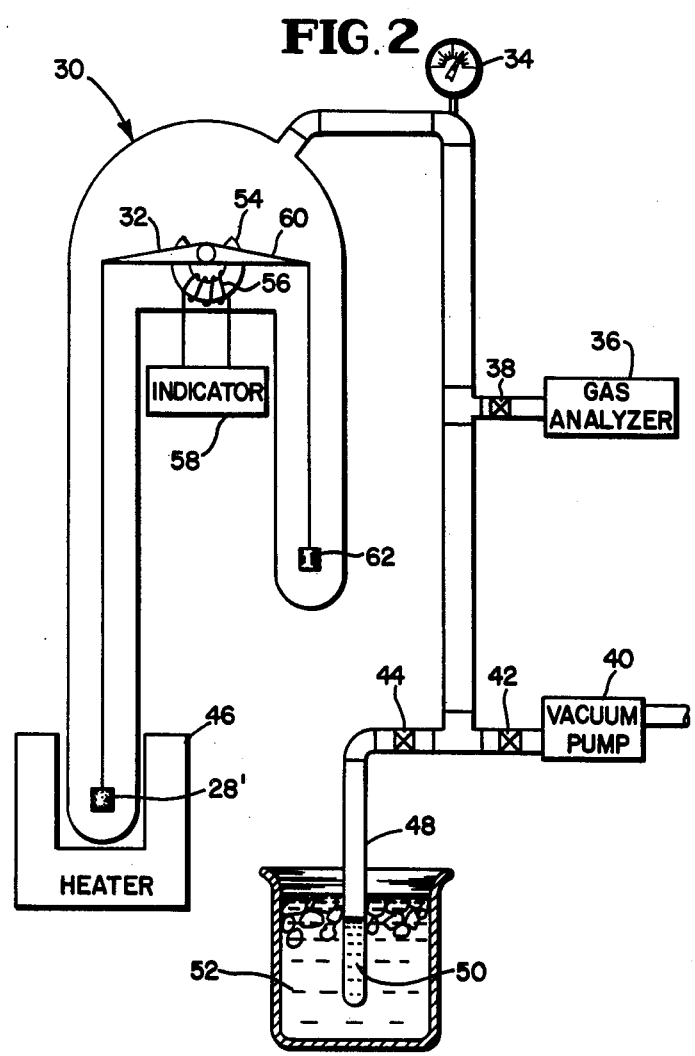
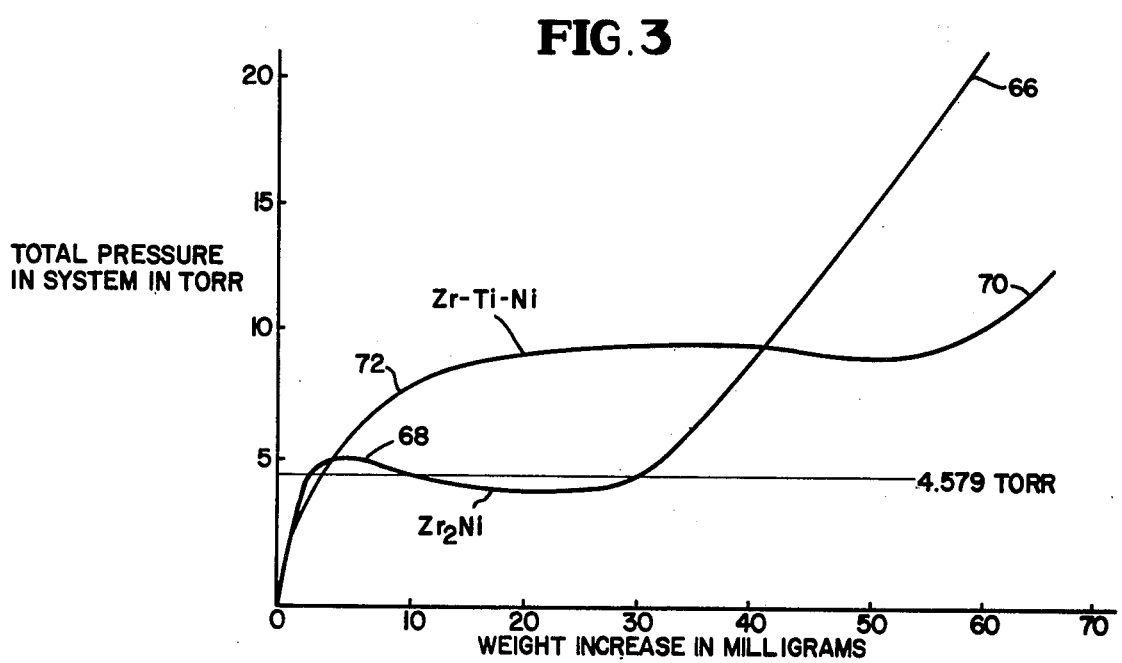

NUCLEAR REACTOR FUEL ELEMENT EMPLOYING ZR₂NI AS A GETTER METAL

This is a divisional of application Ser. No. 670,953, filed Mar. 26, 1976, now U.S. Pat. No. 4,071,335.

Nuclear reactor fuel elements are well known. These nuclear reactor fuel elements generally comprise a sealed container in the form of a tube having two end caps one at each end of the tube. The tube is generally constructed of or is clad with zirconium or a zirconium base alloy. Within the chamber defined by the tube and the end caps are located pellets of fissionable material such as $UO_2$. During operation of the nuclear reactor fuel element, water, generally in the form of water vapor, is released. This water vapor reacts with the components present in the tube with the undesirable release of hydrogen. Hydrogen is known to react with zirconium of the tube causing embrittlement which can proceed to eventual failure. In order to minimize this hydrogen embrittlement it has long been known to provide nuclear reactor fuel elements with a getter device employing a getter metal having a sorbtive capacity for water vapor. One such getter metal is a ternary alloy of zirconium, titanium, and nickel as disclosed for example in United Kingdom Pat. No. 1,370,208 (1974). Unfortunately these ternary alloys selectively sorb oxygen from the water vapor with an undesirable release of hydrogen. Stated differently the ternary alloys do not sorb all of the oxygen and all of the hydrogen present in the water vapor. On the other hand, when sorbing water vapor there is an apparent undesirable release of hydrogen with a consequent danger of hydrogen embrittlement of the tube.

It is therefore an object of the present invention to provide an improved getter metal and an improved nuclear reactor fuel element substantially free of the disadvantages of the prior art.

Another object is to provide an improved getter metal which sorbs both oxygen and hydrogen from water vapor.

A further object is to provide an improved getter metal which sorbs oxygen from water vapor without the release of hydrogen.

A still further object of the present invention is to provide an improved method for reducing hydrogen embrittlement in nuclear reactor fuel elements.

Yet another object is to provide an improved nuclear reactor fuel element employing a getter metal of the present invention.

Additional objects and advantages of the present invention will be apparent to those skilled in the art by reference to the following detailed description thereof and figures wherein:

FIG. 1 is a sectional view of a nuclear reactor fuel element of the present invention employing a getter metal of the present invention;

FIG. 2 is a schematic representation of the laboratory apparatus employed to determine the sorption properties of a getter metal of the present invention and of the known ternary alloys;

FIG. 3 is a graph illustrating the properties of getter metals of the present invention produced from data employing the apparatus of FIG. 2.

According to the present invention there is provided a process for sorbing both oxygen and hydrogen from water comprising contacting the water with a getter metal consisting essentially of, and preferably consisting of $Zr_2Ni$.

The water sorbed according to the present invention can be liquid water but is more often water vapor. The water vapor can be the sole gas or vapor present or can be admixed with other gases. Rare gases such as helium or argon are preferred. Helium is commonly present in nuclear reactor fuel elements. As is well known the helium in a nuclear reactor fuel element is generally present in an amount such that when considered with the other gases present will produce a pressure of one to thirty atmospheres and preferably one to twenty atmospheres. The getter metal of the present invention is active over a wide water vapor pressure range and generally over the water vapor pressure range existing within nuclear reactor fuel elements and generally less than 100 torr.

The getter metal of the present invention can be employed in any physical form but is generally employed as finely-divided particles in order to provide a large surface area for sorption. The particles can vary widely in size but generally are between 1 and 300 microns and preferably are between 1 and 120 microns. The particles of getter metal can be employed in a loose form, coated onto a substrate or more preferably pressed into a coherent porous mass.

The getter metal of the present invention is active over a wide temperature range generally from 150° to 700° C. and preferably from 200° to 500° C. When the getter metal of the present invention has been activated by heating it to a temperature of 800° to 900° C. for 5 to 50 seconds, or at lower temperatures for longer times, then it is active over an even wider temperature range of 20° to 700° C.

Referring now to the drawings and in particular to FIG. 1 there is shown a nuclear reactor fuel element 10 of the present invention. The nuclear reactor fuel element 10 comprises a sealed container 11 comprising a tube 12 into which is fitted a first end cap 13 and a second end cap 14. The end caps 13, 14 are held to the tube 12 by means of welds 15, 16. It is the process of forming the welds 15, 16 which frequently heats areas of the tube 12 adjacent to the welds 15, 16 activating the tube 12 and making the zirconium present in the tube 12 more receptive to hydrogen embrittlement. Within the tube 12 are a number of pellets 20, 21, 22 of fissionable material such as $UO_2$. The space between the uppermost pellet 20 and the end cap 13 is generally referred to as the plenum 24. Within the plenum 24 is a spring 26. Within the spring 26 is a getter device 28 of the present invention. Alternatively the getter device could be in the position of the pellet 20 or could be present in a recess in the end cap 13.

The $Zr_2Ni$ in the getter device 28 is present as finely-divided particles having a size between 1 and 60 microns. The particles are pressed into a coherent porous mass. During operation of the fuel element 10 the getter device 28 is generally maintained at a temperature of about 200° to 500° C. In accordance with conventional manufacturing processes the container 11 is filled with helium to an extent such that the total gas pressure in the plenum 24 and in fact in the rest of the container 11 is between 1 and 30 atmospheres. As shown in FIG. 1 the end cap 13 is provided with a passage 29 which is closed prior to use of the nuclear reactor fuel element in a nuclear reactor.

Referring now to FIG. 2 there is shown a system 30 useful for measuring the water sorption characteristics of getter metals. The system 30 is a closed system of a known volume and is provided with a micro balance 32, a pressure gauge 34, and a gas analyzer 36 such as a gas chromatograph or a mass spectrometer. The gas analyzer 36 is isolatable from the system by a valve 38. The system 30 is connected to a vacuum pump 40 isolatable from the system by a valve 42. The system 30 is also provided with a valve 44 the function of which is explained below. Outside the system 30 is a heater 46 that can be employed to maintain the temperature of the getter device 28′ at any given temperature. The system 30 also comprises a tube 48 within which is an amount of water 50. Surrounding the tube 48 is an ice and water mixture bath 52. The micro-balance 32 comprises a magnet 54 provided with windings 56 connected to an indicator 58. In operation as the weight of the getter device 28′ increases the indicator 58 supplies additional current to the windings 56 in order to keep the balance beam 60 of the micro-balance 32 level. The amount of current employed is converted electronically in the indicator 58 and can be read directly as the weight of the getter device 28′ in excess of the weight of the tare 62. Any of the commercially available micro-balance available from Cahn Industries division of the Ventron Corporation, Paramount, California.

The invention is further illustrated by the following example in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

Employing the apparatus of FIG. 2 the ice bath 52 is removed and the water 50 frozen with a bath of liquid nitrogen not shown. The valve 38 is closed and the valves 42–44 opened. The pump 40 is operated until the pressure in the system 30 is reduced to $10^{-5}$ torr. The valves 42, 44 are then closed and the water 50 permitted to reach 0° C. The pressure in the system 30 is monitored by means of the pressure gauge 34. The ice and water mixture bath 52 is placed around the water 50 and the valve 44 opened. The pressure in the system 30 rises to 4.579 torr which is the vapor pressure of water at 0° C. The temperature of the heater 46 is adjusted such that the temperature of the getter device 28′ is raised to 300° C. The pressure is monitored on the pressure gauge 34 while the weight increase in milligrams is read on the indicator 58. These two values are plotted on FIG. 3 as the inventive line 66. By reference to FIG. 3 and the line 66 it can be seen that the pressure increases from a pressure of 0 to a pressure slightly above the 0° C. equilibrium water vapor pressure of 4.579 torr. It has been theorized that this pressure above the 0° C. equilibrium water vapor pressure, characterized by the line segment 68, is due to a partial release of hydrogen. However, if this is true the hydrogen is rapidly resorbed with the result that the pressure in the system remains at or near the theoretical pressure of water until the getter device 28′ has increased in weight 30 milligrams. At this time the pressure in the system begins to rise above the theoretical pressure of 4.579 torr. Opening of the valve 38 and analysis of the gas in the system 30 by the gas analyzer 36 indicates the presence of hydrogen. In this experiment the getter device 28′ had a cylindrical shape with a diameter of 8.1 millimeters a height of 2.2 millimeters and weighed 593 milligrams and was prepared from $Zr_2Ni$ powder of size less than 60μ exactly as in Example 3.

EXAMPLE 2

This example is not illustrative of the present invention but discloses the undesirable results when employing a known ternary alloy.

The procedure of Example 1 was repeated except that the getter device 28′ was replaced by a getter device of a ternary alloy analyzing 5.03 weight percent nickel; 9.30 weight percent titanium and 82.0 weight percent zirconium, balance attributed to insoluble oxides of zirconium and titanium. This sample was made from powder having a size less than 60μ received from the General Electric Company as a sample of their ternary alloy available under the tradename "Hipalloy". The same piston, cylindrical receptacle and compression forces were used as for the preparation of the sample of Example 1. The comparative getter device had a diameter of 8.1 millimeters a height of 2.3 millimeters and weighed 568 milligrams. The results of this test are shown on FIG. 3 as comparative line 70. As can be seen by reference to FIG. 3 that segment 72 of the line 70 rises above the theoretical value 4.579 torr and remains above this value indicating that a gas other than water vapor is present. Analysis by means of the gas analyzer 36 indicates that this gas is hydrogen indicating that the Hipalloy does not absorb all the hydrogen contained within the molecules with which the Hipalloy reacts.

EXAMPLE 3

This example illustrates the synthesis of a getter device useful in the present invention.

Pure $Zr_2Ni$ is produced as reported in Hansen Binary Alloys pages 1062 and 1063 or by using the technique described by A. Barosi in Residual Gases in Electron Tubes, Edited by T. A. Giorgi and P. della Porta, Academic Press, London 1972. $Zr_2Ni$ thus produced is mechanically broken with a hammer and then passed through a screen such that all the particles have a size less than 60 microns. A portion (600 milligrams) of this powder is placed into a cylindrical receptacle fitted with a piston and the piston compressed with a force of 3000 kilograms to produce a porous compacted mass of $Zr_2Ni$. The porous compacted mass can be employed according to the present invention to sorb water vapor and can be employed as a getter device 28 in the nuclear reactor fuel element 10 shown in FIG. 1 of the drawings.

EXAMPLE 4

This example illustrates the synthesis and use of a further getter device useful in the present invention.

$Zr_2Ni$ is produced as in Example 3 and is mechanically broken with a hammer and then passed through a screen such that all the particles have a size less than 120 microns. A portion (100 milligrams) of this powder was placed in a 12 millimeter outside diameter U-section channel ring container of stainless steel and compressed with a force of about 4000 kilograms to produce a getter device. The getter device is placed in a stream of argon at 25° C. saturated with water vapor such that the water vapor partial pressure is about 23 torr. The getter device is heated to about 300° C. for 10 minutes to cause it to sorb water after which it is allowed to cool and its hydrogen content is measured by known techniques. The hydrogen content is a measure of the water vapor sorbed. The hydrogen content is 0.5 cc. torr per milligram of $Zr_2Ni$.

Although the invention has been described in considerable detail with reference to certain preferred embodiments thereof, it will be understood that variations and modifications can be effected within the spirit and scope of the invention as described above and as defined in the appended claims.

What is claimed is:

1. A nuclear reactor fuel element comprising:
   A. a container defining a chamber,
   B. a fissionable material in the chamber,
   C. a getter metal within the chamber, said getter metal consisting essentially of $Zr_2Ni$ 2. The nuclear reactor fuel element of claim 1 wherein the fissionable material is $UO_2$.

3. The nuclear reactor fuel element of claim 1 wherein the $Zr_2Ni$ is present in the form of finely-divided particles.

4. The nuclear reactor fuel element of claim 1 wherein the $Zr_2Ni$ is present as particles having a size between 1 and 100 microns.

5. The nuclear reactor fuel element of claim 4 wherein the particles are pressed into a coherent porous mass.

6. The nuclear reactor fuel element of claim 1 wherein the greater metal is present in the chamber near one end cap.

7. The nuclear reactor fuel element of claim 1 wherein the getter metal is maintained at a temperature of 200° to 500° C.

8. The nuclear reactor fuel element of claim 1 having helium in the chamber to an extent such that the total gas pressure in the chamber is 1 to 30 atmospheres.

9. A nuclear reactor fuel element of claim 1 comprising:
   A. a sealed container comprising a tube and two end caps closing the tube and defining a chamber,
   B. $UO_2$ in the chamber,
   C. a getter metal in the chamber said getter metal consisting essentially of $Zr_2Ni$ wherein:
      1. the $Zr_2Ni$ is present as finely-divided particles,
      2. the particles have a size between 1 and 120 microns,
      3. the particles are pressed into a coherent porous mass,
      4. the getter metal is in the chamber near one end cap,
      5. the getter metal is maintained at a temperature of 200° to 500° C.,
   D. helium in the chamber to an extent such that the total gas pressure in the chamber is 1 to 20 atmospheres.

* * * * *